United States Patent [19]
Reynard et al.

[11] 3,896,058
[45] July 22, 1975

[54] POLYPHOSPHAZENES CONTAINING THE $CF_3CHFCF_2CH_2O$- GROUP

[75] Inventors: Kennard A. Reynard, Mentor; Arthur H. Gerber, University Heights; Selwyn H. Rose, Beachwood, all of Ohio

[73] Assignee: Horizons Incorporated, Cleveland, Ohio

[22] Filed: Dec. 20, 1973

[21] Appl. No.: 426,527

[52] U.S. Cl. ........... 260/2 P; 260/32.6 N; 260/32.4; 423/300; 423/302
[51] Int. Cl.² .................. C08G 73/00; C08G 79/02
[58] Field of Search ..................... 260/2 P; 423/300

[56] References Cited
UNITED STATES PATENTS

| | | | |
|---|---|---|---|
| 3,271,330 | 9/1966 | Evans | 260/2 P |
| 3,702,833 | 11/1972 | Rose et al | 260/2 P |

*Primary Examiner*—Wilbert J. Briggs, Sr.
*Attorney, Agent, or Firm*—Lawrence I. Field

[57] ABSTRACT

Poly(fluoroalkoxyphosphazene) elastomers and plastics in which the side chains attached to the P atoms in the —P=N—backbone include the monovalent group $CF_3CHFCF_2CH_2O$— are described.

4 Claims, No Drawings

POLYPHOSPHAZENES CONTAINING THE $CF_3CHFCF_2CH_2O$- GROUP 2

This invention relates to new poly(fluoroalkoxyphosphazene) elastomers which differ from prior art poly(fluoroalkoxyphosphazenes) such as those described in Allcock et al., U.S. Pat. No. 3,370,020 issued Feb. 20, 1968; Rose, U.S. Pat. No. 3,515,688 issued Jun. 2, 1970; and Reynard et al., U.S. Pat. No. 3,700,629 issued Oct. 24, 1972. In those polyphosphazenes the side chains comprised $R_fCH_2O-$ groups in which $R_f$ represented fluoroalkyl groups in which all hydrogen atoms had been replaced by fluorine atoms with the possible exception of one hydrogen on the terminal carbon atom.

In the present invention, at least some of the $R_fCH_2O$ groups have all of the hydrogen atoms replaced by fluorine atoms wich the exception of one hydrogen on the carbon atom adjacent to the terminal carbon atom. One object of this invention is to provide polyphosphazenes in which at least one group bonded to phosphorus is $CF_3CHFCF_2CH_2O-$ and the other group is $ZR_fCH_2O-$ and the ratio of groups may vary from 1:3 to 3:1. The preferred $ZR_f$ group is $CF_3CHFCF_2-$ or it may contain from 1 to 4 carbon atoms which are fluorinated and in the latter groups Z is F or H. As a consequence of this structural change in the side chain, the solubility characteristics of the resulting homopolymer or copolymer are different from the solubilities exhibited by the known poly(fluoroalkoxyphosphazenes) noted above. The polymers of this invention characteristically have a degree of polymerization varying from 10 to 50,000.

The invention will be more fully appreciated from the description which follows, in which examples of preferred embodiments are set forth by way of illustration and are not intended to limit the invention in any way.

EXAMPLE 1

Preparation of $[(CF_3CHFCF_2CH_2O)_2PN]_n$

Distilled $CF_3CHFCF_2CH_2OH$ alcohol (36.0 g., 0.199 mole) was placed in 200 ml. of dry tetrahydrofuran and was cooled to $-5°C$. Potassium t-butoxide (20.3 g., 0.19 mole) was added over a period of 15 minutes to produce a reddish brown solution. Poly(dichlorophosphazene) was prepared as described in Example 1 of U.S. Pat. No. 3,700,629 or Example 1 of U.S. Pat. No. 3,370,020. The polymer (10.0 g., 0.172 equiv.) was dissolved in 100 ml. of dry benzene and was added to the fluoroalkoxide solution at $-5°C$ over a period of 45 minutes. The mixture was stirred at $-5°C$ for 4 hours and allowed to come to room temperature overnight. The polymer was precipitated by the addition of 300 ml. of benzene and was washed several times with a mixture of benzene/isopropyl alcohol (4v/1v). The yellow sticky polymer was dissolved in 100 ml. of the azeotropic mixture of $CCl_2FCClF_2$ with acetone and the solution was mixed with water until the aqueous layer was free of chloride ion (negative $AgNO_3$ test). The water layer was removed and the polymer was precipitated by the addition of benzene. A yellow sticky material (4 g.) was obtained which showed a Tg (DTA) of $-67°C$ and 5% and 10% weight losses (TGA) at $287°C$ and $302°C$, respectively.

EXAMPLE 2

Preparation of $[(CF_3CHFCF_2CH_2O)_2PN]_n$

In a manner similar to that described in Example 1, a solution of $CF_3CHFCF_2CH_2OH$ was prepared at room temperature. Progressive decomposition was noted. The amount of fluoroalkoxide which remained was determined by titration and the appropriate amount of poly(dichlorophosphazene) polymer was added to the mixture. The product was purified as in Example 1 and showed a Tg (DTA) of $-66°C$ and weight losses (TGA) of 5% and 10% at $330°C$ and $365°C$, respectively.

EXAMPLE 3

Preparation of $[(CF_3CH_2O)_2PN-(CF_3CHFCF_2CH_2O)_2PN]_n$

Distilled $CF_3CHFCF_2CH_2OH$ alcohol (52.4 g., 0.29 mole) and $CF_3CH_2OH$ alcohol (28.8 g., 0.29 mole) were placed in 350 ml. of dry tetrahydrofuran and the mixture was cooled to $-5°C$. Potassium t-butoxide (60.6 g., 0.55 mole) was added over a period of 15 minutes and a reddish brown solution was formed. Poly(dichlorophosphazene) (30.0 g., 0.52 equiv.) was dissolved in 300 ml. of dry benzene and the solution was added to the fluoroalkoxides at $-5°C$ over a period of 2 hours. The elastomeric copolymer was purified by the procedures described in Example 1 and showed a Tg (DTA) of $-61°C$ and weight losses (TGA) of 5% and 10% at $300°C$ and $320°C$, respectively. Table I sets forth some of the properties of the polyphosphazenes of Examples 1-3. Copolymers which contained mole ratios of $1(CF_3CH_2O):3(CF_3CHFCF_2CH_2O)$ and $3(CF_3CH_2O):1(CF_3CHFCF_2CH_2O)$ were prepared and found to be elastomers with similar solubilities to the copolymer of Example 3.

Table I

Characterization of Poly(fluoroalkoxyphosphazenes) Prepared from $CF_3CHFCF_2CH_2OH$

| POlymer of | $[\eta]_{acetone}^{30°C}$ (dl./g.) | Analysis (%)[a] | | | |
|---|---|---|---|---|---|
| | | C | H | N | Cl |
| Example 1 | 0.2 | 23.2 | 1.4 | 3.7 | 0.1 |
| | | (23.6) | (1.5) | (3.4) | (0.0) |
| Example 2 | 1.5 | 23.8 | 1.4 | 3.2 | 0.1 |
| | | (23.6) | (1.5) | (3.4) | (0.0) |
| Example 3 | 0.57 | 21.7 | 1.6 | 4.7 | 0.1 |
| | | (22.2) | (1.5) | (4.3) | (0.0) |

[a]Calculated values in parentheses

The solubilities of the polymers of this invention show unexpected behavior from known related poly(fluoroalkoxyphosphazenes) as seen from Table II. Specifically, there is a striking difference in solubility behavior of the polymers of Examples 1, 2, and 3 compared to the known polymers $[(n-C_3F_7CH_2O)_2PN]_n$ and $[(CF_3CH_2O)_2PN-(n-C_3F_7CH_2O)_2PN]_n$. The latter two polymers are insoluble in all common organic solvents. Furthermore, the polymers of Examples 1, 2, and 3 differ unexpectedly from $[(CF_3CH_2O)_2PN-(HCF_2C_3F_6CH_2O)_2PN]_n$ copolymer in that they are insoluble in acetonitrile and soluble in dimethylformamide whereas the known copolymer is not. Hence, polymers which contain the $CF_3CHFCF_2CH_2O-$ moiety may be used as coatings or in mechanical goods applications where the poly(fluoroalkoxyphosphazenes) of the prior art cannot.

The $[CF_3CHFCF_2CH_2O)_2PN]_n$ homopolymer of this invention is a plastic which can readily be cast into films showing excellent resistance to water, dilute acids and alkalies, and many common organic solvents. On the other hand, many of the copolymers which result by partial replacement of the $CF_3CHFCF_2CH_2O$— groups, for example by $CF_3CH_2O$— groups, are elastomers which upon compounding and crosslinking by known methods afford vulcanizates which are useful as hoses, gaskets, potting compounds and the like.

For the sake of brevity, the copolymers of this invention are designated by the formula $[(ZR_fCH_2O)_2PN-(CF_3CHFCF_2CH_2O)_2PN]_n$. In fact, they are polymers which contain units represented by the formulas,

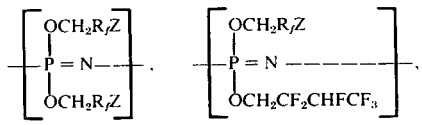

and 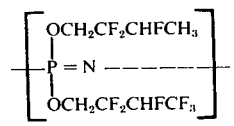

and the fluoroalkoxy groups are distributed along the —P=N— backbone in a nonregular fashion.

We claim:
1. Poly(fluoroalkoxyphosphazenes) soluble in dimethylformamide and represented by the general formula

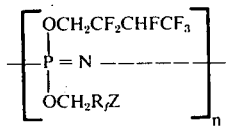

wherein the $ZR_f$ groups are selected from $CF_3CHFCF_2$— or from groups which contain from 1 to 4 carbon atoms which are fluorinated and in the latter groups Z is F or H, and the amount of $CF_3CHFCF_2$ groups may be present in amounts up to 100%, and n is an integer from 10 to 50,000.

2. The homopolymer of claim 1 represented by the formula $[(CF_3CHFCF_2CH_2O)_2PN]_n$.

3. A copolymer according to claim 1 represented by the formula $[(CF_3CH_2O)_2PN-(CF_3CHFCF_2CH_2O)_2PN]_n$.

4. A process for the preparation of the polymers of claim 1 wherein a solution of $CF_3CHFCF_2CH_2OH$ is cooled and maintained at temperatures below room temperature during successive reactions with hindered metal alkoxides and with $[Cl_2PN]_n$ where n is defined in claim 1.

* * * * *

TABLE II

| | Chemical and Solvent Resistance | | |
|---|---|---|---|
| | Acetonitrile | Pyridine | Dimethylformamide |
| $[(n-C_3F_7CH_2O)_2PN]_n$ (U.S. Ser. No. 284,200) | I | I | I |
| $[(CF_3CH_2O)_2PN]_n$ (U.S. Pat. 3,370,020) | I | I | I |
| $[(CF_3CH_2O)_2PN-(n-C_3F_7CH_2O)_2PN]_n$ (U.S. Pat. 3,515,688) | I | I | I |
| $[(CF_3CH_2O)_2PN-(HCF_2C_3F_6CH_2O)_2PN]_n$ (U.S. Pat. 3,515,688) | S | I | I |
| $[(CF_3CHFCF_2CH_2O)_2PN]_n$ (this invention) | I | S | S |
| $[(CF_3CH_2O)_2PN-(CF_3CHFCF_2CH_2O)_2PN]_n$ (this invention) | I | I | S |

Legend
S — Soluble
I — Insoluble